United States Patent Office 3,507,908
Patented Apr. 21, 1970

3,507,908
COPOLYMER OF A VINYL ESTER OF A FATTY
ACID AND A DIALKYL FUMARATE
David W. Young, Homewood, and Thomas J. Clough, Glenwood, Ill., assignors to Sinclair Research, Inc., a corporation of Delaware
No Drawing. Original application July 29, 1963, Ser. No. 298,482, now Patent No. 3,413,103, dated Nov. 26, 1968. Divided and this application Nov. 22, 1967, Ser. No. 701,501
Int. Cl. C07c 69/60
U.S. Cl. 260—485                                  9 Claims

ABSTRACT OF THE DISCLOSURE

A copolymer having a molecular weight of about 750 to 3000 which is prepared by copolymerizing the vinyl ester of a fatty acid having about 2 to 18 carbon atoms and a dialkyl fumarate wherein the alkyl groups contain about 8 to 18 carbon atoms on the average. The copolymerization is conducted at a temperature of about 50 to 125° C. and in the presence of a catalytic amount of a complex salt of a lower trialkyl aluminum and a compound can be
(A) a lower dialkyl ether;
(B) a tertiary amine having the general formula:

wherein R is a lower alkyl group and R′ is a cyclic hydrocarbon radical containing 6 carbon atoms in the ring; and
(C) pyridine.
The molar ratio of dialkyl fumarate to vinyl ester is about 1:0.2 to 1:6.

---

This application is a division of application Ser. No. 298,482, filed July 29, 1963 now Patent No. 3,413,103.

This invention relates to a method for the production of a low molecular weight copolymer having pour point depressing properties in distillate mineral fuel oils.

In U.S. Patent No. 2,666,746 to John C. Munday there are disclosed as useful pour depressors and viscosity index improvers for mineral lubricating oils certain high molecular copolymers of a vinyl ester and a dialkyl fumarate prepared by the copolymerization of the monomers using a peroxide compound as a catalyst. It has now been found that employment of the complex salt of a trialkyl aluminum and a material selected from the group consisting of lower alkyl ethers and certain nitrogen-containing compounds as the catalyst in the polymerization process, provides an oil-soluble copolymer which not only is of a relatively low molecular weight compared to the molecular weight of the copolymer prepared when using a peroxide compound as a catalyst, but also possesses improved pour point depressing properties.

The catalyst of the invention is a complex of approximately equal molar amounts of a trialkyl aluminum, preferably wherein the alkyl substituents are lower alkyls, say of 1 to 4 carbon atoms, and a compound selected from the group consisting of A, B and C identified below: (A) the lower dialkyl ethers (say of 1 to 4 carbon atoms in each alkyl group) including the lower dialkyl ethers wherein the two alkyl substituent chains are joined to form hetero-O-cyclic compounds. The ethers can be simply of mixed liquids, with the particularly preferred ethers being diethyl ether and tetrahydrofuran; (B) a tertiary amine having the general formula:

wherein R is a lower alkyl group, preferably ethyl, and R′ is a cyclic hydrocarbon radical containing 6 carbon atoms in the ring, such as a phenyl or cyclohexyl radical. The cyclic hydrocarbon R′ can be substituted with non-interfering substituents as, for instance, alkyl groups and the lower alkyl R groups can also be substituted if desired. Preferred tertiary amines are dimethylphenyl amine and dimethylcyclohexyl amine; and (C) pyridine. In preparing the complex salts an excess of either reactant might be used.

The complex of the trialkyl aluminum and the ether or nitrogen-containing compound can be simply prepared by mixing the two reactants at ambient temperatures but elevated temperatures up to the degradation temperature of the reactants, generally about 70 to 80° C., can be used if desired. Although unnecessary the reaction can be carried out in the presence of an inert solvent such as the normally liquid alkanes.

The dialkyl fumarate ester employed in the polymerization reaction of the invention is the fumaric acid ester of one or more saturated alkanols, straight or branched chain, having about 8 to 18 carbon atoms, preferably about 10 to 14 carbon atoms. Suitable alcohols include for example, octyl, decyl, cetyl, octadecyl alcohols and mixtures thereof. When mixtures of alcohols are used, alcohols having less than 8 carbon atoms, for instance, hexyl alcohol, can be include as long as the mixture of alcohols contains a sufficient amount of the higher alcohols to make a total mixed alcohol product averaging at least about 8 carbon atoms, preferably about 10 to 14 carbon atoms. A very suitable commercially available mixed alcohol is a product obtained by the hydrogenation of coconut oil. This product is a mixture of saturated straight chain alcohols ranging from about 10 to 18 carbon atoms and predominating in lauryl alcohol.

The other reactant copolymerized with the dialkyl fumarate is a vinyl ester of a fatty acid of about 2 to 18 carbon atoms. Examples of suitable fatty acids include acetic, propionic, butyric, lauric, myristic, palmitic, stearic, and mixtures thereof. The preferred ester is vinyl acetate.

The proportions of dialkyl fumarate to the vinyl ester employed in the copolymerization can vary widely depending on the particular fumarate and vinyl ester selected but often are in the range of about 1:0.2 to 1:6, preferably 1:0.5 to 1:5. The copolymerization is affected by mixing the two reactants and heating the mixture to a temperature of about 50 to 125° C., preferably about 60 to 100° C., in the presence of the catalyst of the invention. If necessary, either superatmospheric pressure or refluxing can be employed to prevent loss of the reactants by vaporization. The catalyst is employed in amounts sufficient to catalyze the reaction and generally is in the range of about 0.1 to 5.0% by weight of the monomers. Preferably the polymerization is conducted in the presence of an inert liquid solvent or diluent such as liquid alkanes, preferably n-heptane, or other inert liquids. Advantageously, the solvent is the same as that used in the formation of the etherate catalyst, should an inert diluent be utilized in the preparation of the catalyst. It is also preferred to exclude oxygen from the reaction by any suitable means, for instance, by conducting the copolymerization under an atmosphere of nitrogen, carbon dioxide or other inert gas.

The reaction time will vary inversely with the temperature employed and may fall in the range of about 4 to 40 hours. The reaction is continued to obtain a copolymer product which is a light viscous oil possessing an average molecular weight of about 750 to 3,000 determined by the K. Rast's method (55 Ber. 55, 1051, 3727 (1922)).

The mineral oil bases which are improved by the copolymer of the invention are liquid petroleum hydrocarbon fuel oils boiling primarily above the gasoline range and include, for instance, diesel fuels, domestic fuel oils, etc. These oils are usually petroleum middle distillates and commonly have relatively high pour points, for instance at least about $-10°$ F. or higher. The oils can be in their relatively crude state or they can be treated in accordance with well-known commercial methods such as acid or caustic treatment, etc. Fuel oils which can be improved by the copolymers are, for instance, hydrocarbon fractions boiling primarily in the range of about 300° to 750° F. The fuel oils can be straight run distillate fuel oils, catalytically or thermally cracked distillate fuel oils, naphthas and the like with cracked distillate stocks. The cracked materials will frequently be about 15 to 70 volume percent of the fuel.

The amount of the copolymer added to the base oils is dependent upon the particular oil employed but in all cases will be that sufficient to reduce the pour point. Often the amounts used will fall in the range of about 0.01 to 1% by weight or more, preferably about 0.05 to 0.5% by weight of the oil, the latter component being the major component of the composition which may contain additives other than the copolymer of the invention.

The following examples are included to illustrate the improved results provided by the copolymer prepared in accordance with the method of the present invention.

EXAMPLE I

The following components were mixed together at 27° C.: 32.5 g. didodecyl fumarate, 5.5 g. vinyl acetate, .19 g. benzoyl peroxide and 4 g. N-heptane. The mixture was then heated to 80° C. under a nitrogen atmosphere for 16 hours. The product was vacuum distilled (1 mm. vacuum) to a temperature of 145° C. The resulting copolymer had an average molecular weight (Rast's method) of approximately 8000 to 10,000 and was viscous and dark in color. The copolymer was blended with a fuel oil composed of a blend of 50% straight run gas oil and 50% catalytically cracked gas oil in the various concentrations shown below and the pour point of each blend was determined. The results were as follows:

| Concentration of polymer, percent: | Pour point, ° F. |
|---|---|
| 0.20 | −40 |
| 0.10 | −40 |
| 0.05 | −25 |

EXAMPLE II

Example I was repeated but using the complex salt of triethyl aluminum and diethyl ether as a catalyst instead of the benzoyl peroxide catalyst in the preparation of the copolymer. The resulting copolymer was a light viscous oil having a molecular weight of about 1100. (Rast's method) the copolymer was blended with the same fuel oil of Example I in identical concentrations and the pour point of each of the blends was determined. The results were as follows:

| Concentration of polymer, percent: | ASTM pour point, ° F. |
|---|---|
| 0.20 | −55 |
| 0.10 | −55 |
| 0.05 | −35 |

A comparison of the data of Examples I and II demonstrates the superiority of the copolymer of the present invention.

EXAMPLE III

Results similar to those of Example II can be obtained by adding to the fuel oil the copolymer prepared as in Example I but using the complex of triethyl aluminum and dimethyl phenyl amine as a catalyst instead of benzoyl peroxide.

EXAMPLE IV

Substantially the same results as in Example II can be obtained by utilizing the copolymer prepared by the method of Example I but using instead of the benzoyl catalyst, the complex of triethylaluminum and pyridine.

We claim:
1. A method of preparing an improved pour point depressor which consists essentially of copolymerizing the vinyl ester of a fatty acid having about 2 to 18 carbon atoms and a dialkyl fumarate wherein the alkyl groups contain about 8 to 18 carbon atoms on the average, at a temperature of about 50 to 125° C. and in the presence of a catalytic amount of a complex salt of a lower trialkyl aluminum and a compound selected from the group consisting of
   (A) a lower dialkyl ether;
   (B) a tertiary amine having the general formula:

wherein R is a lower alkyl group and R' is a cyclic hydrocarbon radical containing 6 carbon atoms in the ring; and
   (C) pyridine,
the molar ratio of dialkyl fumarate to vinyl ester being about 1:0.2 to 1:6.

2. The method of claim 1 wherein the complex salt is of a lower triethylaluminum and diethyl ether.

3. The method of claim 1 wherein the vinyl ester of a fatty acid is vinyl acetate.

4. The method of claim 1 wherein the dialkyl fumarate is didodecyl fumarate.

5. The method of claim 1 wherein the vinyl ester of a fatty acid is vinyl acetate and the dialkyl fumarate is didodecyl fumarate.

6. The method of claim 2 wherein the vinyl ester of a fatty acid is vinyl acetate and the dialkyl fumarate is didodecyl fumarate.

7. A copolymer having a molecular weight of about 750 to 3000 which is prepared by copolymerizing the vinyl ester of a fatty acid having about 2 to 18 carbon atoms and a dialkyl fumarate wherein the alkyl groups contain about 8 to 18 carbon atoms on the average, at a temperature of about 50 to 125° C., and in the presence of a catalytic amount of a complex salt of a lower trialkyl aluminum and a compound selected from the group consisting of
   (A) a lower dialkyl ether;
   (B) a tertiary amine having the general formula:

wherein R is a lower alkyl group and R' is a cyclic hydrocarbon radical containing 6 carbon atoms in the ring; and
   (C) pyridine,
the molar ratio of dialkyl fumarate to vinyl ester being about 1:0.2 to 1:6.

8. A copolymer having a molecular weight of about 750 to 3000 which is prepared by copolymerizing vinyl acetate and a dialkyl fumarate wherein the alkyl groups contain about 8 to 18 carbon atoms on the average, at a temperature of about 50 to 125° C., and in the presence of a catalytic amount of a complex salt of triethylaluminum and diethyl ether, the molar ratio of dialkyl fumarate to vinyl ester being about 1:0.2 to 1:6.

9. A copolymer having a molecular weight of about 750 to 3000 which is prepared by copolymerizing vinyl acetate and didodecyl fumarate, at a temperature of about 60 to 100° C., and in the presence of a catalytic amount of a complex salt of triethylaluminum and diethyl ether, the molar ratio of didodecyl fumarate to vinyl acetate being about 1:0.5 to 1:5.

References Cited
UNITED STATES PATENTS 2,936,300   11/1955   Tutwiler    260—78.5

LORRAINE A. WEINBERGER, Primary Examiner

E. J. SKELLY, Assistant Examiner

U.S. Cl. X.R.

260—78.5